United States Patent [19]
Waldman et al.

[11] Patent Number: 6,001,946
[45] Date of Patent: Dec. 14, 1999

[54] CURABLE SILANE-ENCAPPED COMPOSITIONS HAVING IMPROVED PERFORMANCES

[75] Inventors: Bruce A. Waldman, Peekskill; Shayne J. Landon, Carmel, both of N.Y.; Herbert E. Petty, Bethel, Conn.

[73] Assignee: Witco Corporation, Greenwich, Conn.

[21] Appl. No.: 08/933,122

[22] Filed: Sep. 18, 1997

Related U.S. Application Data

[63] Continuation-in-part of application No. 08/700,347, Sep. 23, 1996, abandoned.

[51] Int. Cl.⁶ .................................................. C08G 77/26
[52] U.S. Cl. ............................. 528/28; 528/41; 524/869; 556/418
[58] Field of Search ....................... 528/28, 41; 524/869; 556/418

[56] References Cited

U.S. PATENT DOCUMENTS

| | | | |
|---|---|---|---|
| 3,627,722 | 12/1971 | Selter ..................................... | 260/37 N |
| 3,632,557 | 1/1972 | Brode et al. ..................... | 260/77.5 TB |
| 3,979,344 | 9/1976 | Bryant et al. ...................... | 260/77.5 A |
| 4,067,844 | 1/1978 | Barron et al. .......................... | 260/37 N |
| 4,222,925 | 9/1980 | Bryant et al. .......................... | 260/37 N |
| 4,345,053 | 8/1982 | Rizk et al. ............................... | 525/440 |
| 4,374,237 | 2/1983 | Berger et al. ............................. | 528/28 |
| 4,474,933 | 10/1984 | Huber et al. ............................... | 528/26 |
| 4,625,012 | 11/1986 | Rizk et al. ................................ | 528/28 |
| 4,645,816 | 2/1987 | Pohl et al. ................................. | 528/28 |
| 5,272,224 | 12/1993 | Baghdachi et al. ...................... | 525/460 |
| 5,354,880 | 10/1994 | Pepe et al. ................................ | 556/407 |
| 5,364,955 | 11/1994 | Zwiener et al. ......................... | 556/418 |
| 5,756,751 | 5/1998 | Schmalstieg et al. .................. | 548/110 |
| 5,821,326 | 10/1998 | Kurek et al. ............................. | 528/332 |

*Primary Examiner*—Margaret G. Moore
*Attorney, Agent, or Firm*—Edward K. Welch, II; Andrew S. Reiskind; Timothy X. Witkowski

[57] ABSTRACT

Certain members of the class of N-silylalkyl-aspartic acid esters, when used to endcap polyurethane polymers, offer moisture curable, one-part sealant formulations having significantly improved physical property improvements over other members of the same class of organofunctional silanes. More specifically, polyurethane polymers terminated with either the dibutyl or diethyl maleate/primary aminoalkyl silane addition product offer sealants which substantially outperform comparative sealants obtained using polymers endcapped with other olefinic carboxylate ester (dimethyl maleate, dimethyl crotonate) or nitrile (acrylonitrile)/primary aminoalkyl silane addition products. Additionally, sealant formulations incorporating the dibutyl or diethyl maleate/primary aminoalkyl silane terminated polymers demonstrate unexpected improvements in both elongation and tensile strength performance. The dibutyl maleate and dimethyl maleate based polymers give significant increase in tear resistance.

48 Claims, No Drawings

CURABLE SILANE-ENCAPPED COMPOSITIONS HAVING IMPROVED PERFORMANCES

This application is a continuation-in-part of application Ser. No. 08/700,347, filed Sep. 23, 1996, now abandoned.

BACKGROUND OF THE INVENTION

Urethane prepolymers have been modified in the past to improve or add to their basic properties by end-capping some or all of the isocyanate groups with various organofunctional silanes. Among these methods, U.S. Pat. No. 3,632,557 teaches the complete end-capping of conventional polyurethane prepolymers with primary and secondary aliphatic aminosilanes. U.S. Pat. No. 3,979,344 details a room temperature curable silicon terminated organic sealant composition comprising a small quantity of 3-(N-2-aminoethyl) aminopropyltrimethoxysilane endcapper to improve the sealant's cure speed. U.S. Pat. No. 4,222,925 details the same composition as is given in U.S. Pat. No. 3,979,344 but also incorporates a reinforcing carbon black filler. Sealants having improved elongation and flexibility were prepared using silane end-capped polyurethane polymers obtained from silane monomers having at least one dialkoxy group and an organofunctional group with at least one active hydrogen atom in U.S. Pat. No. 4,645,816.

However, polyurethane prepolymers end-capped with primary aminofunctional silanes contain an active hydrogen atom which is capable of further reactions with the isocyanate end groups. This reactivity can lead to undesirable stability performance of both the polymer and sealant compositions. Several methods teach the use of secondary aminofunctional silane endcappers. For example, U.S. Pat. No. 4,374,237 teaches the curable isocyanate terminated polyurethane prepolymers at least part of whose terminal isocyanate groups have been reacted with a secondary amine containing silane monomer having two trialkoxy silane groups. U.S. Pat. No. 4,474,933 describes crosslinkable polyurethane resin mixtures that have been capped with various primary and secondary difunctional aminosilane endcappers. Other references of interest relating to silane end-capped urethane prepolymers and sealants are U.S. Pat. No. 3,627,722; U.S. Pat. No. 4,067,844; U.S. Pat. No. 4,625,012; U.S. Pat. No. 4,345,053; U.S. Pat. No. 4,645,816; and U.S. Pat. No. 5,354,880).

More recently, U.S. Pat. No. 5,364,955 teaches the use of N-alkoxysilylalkyl aspartic acid esters, and discloses the reaction of the dimethyl and diethyl esters with a diisocyanate prepolymer and the further reaction of this product so as to form a polymeric film on a glass surface. This patent does not disclose, let alone quantify, any properties of the polymeric film thus formed other than that it is opaque and elastic. The present applicants have determined, however, that sealants prepared from polyurethane capped with the dimethyl ester disclosed in this patent exhibit only mediocre performance in such significant properties as thermal stability, elongation, tensile strength, and tear resistance, from which one would expect the same mediocre performance from the other esters disclosed in this patent.

Therefore, it is an object of the present invention to provide compositions useful for instance as sealants, coatings, and the like, based upon urethane prepolymers end-capped with certain N-alkoxysilylalkyl aspartic acid esters, wherein the compositions upon curing form a product having superior elongation, tensile strength and tear resistance in comparison to formulations based on other N-alkoxysilylalkyl aspartic acid ester end-capped polymers.

BRIEF SUMMARY OF THE INVENTION

One aspect of the present invention is organofunctional silanes represented by the general formula (1):

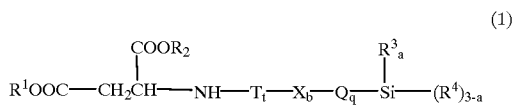

in which $R^1$ and $R^2$ represent identical or different alkyl groups having 2 to 4 carbon atoms, most preferably a butyl group, and $R^3$ represents an alkyl radical having 1 to 6 carbons, most preferably having one carbon, and $R^4$ represents a $C_1$ to $C_6$ alkoxy group (methoxy being most preferred) or a $C_3$ to $C_5$ ketoximato group, and T represents an alkylene radical of 1 to 6 carbons and may be linear, branched or cyclic, most preferably 2 or 3 carbons and linear, and Q represents an alkylene radical of 1 to 10 carbons and may be linear, branched or cyclic, and X is chosen from the group of aryl, alkyl-substituted aryl, —O— or —S—, preferably —O—;

a is 0, 1 or 2;

b is 0 or 1;

t is 0 or 1; and q is 0 or 1;

provided that when b is zero, then t and q cannot both be zero; and provided that when b is 1 and X is —O— or —S—, then t is 1 and q is 1; and provided that when $—T_t—X_b—Q_q—$ is any of $—(CH_2)_{2-4}—$, then the Si is substituted with one or both of alkyl and/or ketoximato.

Another aspect of the present invention is a composition of matter which is the product of reacting (A) a prepolymer obtained by reacting a polyol component with an excess of difunctional or polyfunctional isocyanate so that said prepolymer contains unreacted isocyanate groups with (B) a silane of formula (1).

Another aspect of the present invention is curable formulations useful for instance as sealants, containing the aforementioned composition of matter together with a cure catalyst and one or more conventional functional adjuvants selected from the group consisting of fillers, plasticizers, thixotropes, antioxidants, ultraviolet stabilizers, dehydrating agents and adhesion promoters.

Yet another aspect of the present invention is the process of of making a composition of matter which upon curing exhibits improved elongation, tensile strength and tear resistance, comprising reacting the aforementioned prepolymer (A) with a silane of the aforementioned formula (1).

DETAILED DESCRIPTION OF THE INVENTION

Compounds of formula (1) can be prepared by reaction of the corresponding unsaturated maleate diester $R^1O(O)C—CH=CH—C(O)OR^2$ with the primary amine of the formula $H_2N—T_t—X_b—Q_q—Si(R^3)_a(R^4)_{3-a}$ under conditions known in the literature. Referring to formula (1), $R^4$ may be, other than alkoxy as preferred, a ketoximato group by which is meant a group of the formula $(R^x)(R^y)C=N-O-$ wherein each of $R^x$ and $R^y$ is methyl or ethyl. The group X can be —O—, which is preferred, or —S—, or aryl or alkyl-substituted aryl. Aryl X groups include phenyl, which is preferred, and bicyclic systems such as naphthyl and indanyl. Preferred alkyl substituents on aryl X groups include one or two alkyl groups each containing 1 to 6 carbon atoms, preferably methyl and dimethyl.

When the group $(-T_t-X_b-Q_q-)$ is $-(CH_2)_2-$, $-(CH_2)_3-$, or $-(CH_2)_4-$, then the Si atom in the compound of formula (1) is substituted with one or both of alkyl and/or ketoximato, by which is meant in this case that the Si atom has at least one alkyl substituent, or at least one ketoximato substituent, or both at least one alkyl substituent and at least one ketoximato substituent. When there is no X group present, then there must be at least one carbon atom between the NH group and the Si atom. When X is present as the hetero atom —O— or —S—, then there must be at least one carbon atom between the hetero atom and the NH and at least one carbon atom between the hetero atom and the Si.

Preparation of the Polymers

Isocyanate terminated polyurethane prepolymers, useful in the present invention, are prepared by reacting an excess of organic polyisocyanate with a polyol or a combination of polyols usually in the presence of a catalyst. As used herein, the term "polyisocyanate" means an organic compound having two or more than two isocyanate groups. The reaction temperature is typically in the range of 60° to 90° C.; the reaction time is about 4 to 8 hours. Examples of preparations are set out in the next section.

Suitable polyisocyanates include any from which polyurethane polymers can be prepared by the customary sequence of reaction with polyol to form a prepolymer followed by chain extension. Useful diisocyanates include, for example, 2,4-toluene diisocyanate, 2,6-toluene diisocyanate, 4,4' diphenyl-methanediisocyanate, isophorone diisocyanate, dicyclohexylmethane-4,4'-diisocyanate, various liquid diphenylmethane-diisocyantes containing a mixture of 2,4- and 4,4' isomers, Desmodur N® and the like, and mixtures thereof. A preferred isocyanate functional monomer used in the present invention is the mixture of 2,4- and 4,4' diphenylmethane diisocyanates (MDI) which is available from Bayer under the trade name Mondur ML.

In producing the isocyanate terminated polyurethane prepolymers of the present invention, one or more diols and triols are reacted with an organic polyisocyanate. Such polyols, which have two or more hydroxyl groups, generally have a molecular weight between 250 and 16,000, more narrowly between about 1000 to 12,000, and can be either polyether or polyester polyols. Suitable polyols included polyoxyalkylene (especially polyoxyethylene, polyoxypropylene, and polyoxybutylene) diols, polyoxyalkylene triols, polytetramethylene glycols, polycaprolactone diols and triols, and the like. Preferred polyols used in the present invention are polypropylene glycols with equivalent weights between about 500 and 6000, more narrowly between about 1000 and 4000.

Suitable catalysts useful in the preparation of the above mentioned polyurethane prepolymers are dialkyltin dicarboxylates, such as dibutyltin dilaurate and dibutyltin acetate, tertiary amines, the stannous salts of carboxylic acids, such as stannous octoate and stannous acetate, and the like. The preferred catalyst used in the present invention is dibutyltin dilaurate.

To prepare isocyanate terminated polyurethane prepolymers useful in this invention, at least a slight mole excess of the —NCO equivalents (groups) with respect to the hydroxyl (—OH) equivalents (groups) is employed to terminate the polymer chain with isocyanate groups. The preferred molar ratio of NCO to OH is from about 1.2 to 4.0, depending on the selection of polyols.

Curable N-alkoxysilylalkyl-aspartic acid ester end-capped urethane polymers of the present invention are prepared from the reaction of a N-(organosilyl)-aspartic acid diester endcapper of formula (1) with the isocyanate terminated polyurethane prepolymer described above. A slight excess (about 3 to 5%) of the organofunctional silane endcapper should be employed in order to ensure a complete reaction of all the terminal isocyanate groups of the prepolymer. The reaction is conducted preferably in the absence of moisture and at a temperature in the range of 60° to 90° C. The reaction is complete when the percent (%) isocyanate is determined to be zero.

Formulations

Formulations useful for instance as sealants incorporating the above silane terminated polyurethane polymer can be prepared by thoroughly mixing together the silane terminated polyurethane polymer, a cure catalyst, and one or more conventional functional adjuvants such as fillers, plasticizers, thixotropes, antioxidants, U. V. stabilizers, dehydrating agents and adhesion promoter(s). Effective mixing can be achieved using a double planetary mixer. Typically, the silane terminated polyurethane polymer, fillers, stabilizers and plasticizer are mixed at 80° C. for 60 to 90 minutes. After cooling to 50° C., the desired silane adhesion promoter, dehydrating agent and cure catalyst are added and the mixture is stirred, typically for an additional 30 minutes.

Typical fillers suitable for addition to formulations include reinforcing fillers such as fumed silica, precipitated silica and calcium carbonates. Treated calcium carbonates having particle sizes from $0.07\mu$ to $4\mu$ are preferred and are available under several trade names: Ultra Pflex, Super Pflex, Hi Pflex from Specialty in Minerals; Winnofil SPM, SPT from Zeneca Resins; Hubercarb lat, Hubercarb 3Qt and Hubercarb W from Huber and Kotomite from ECC. These fillers can be used either alone or in combination. The fillers can comprise up to 200 parts per 100 parts of the silane terminated polyurethane polymer with 80 to 150 parts being the more preferred loading level.

Any of the plasticizers usually used in this field can also be used in the invention to increase elongation and to facilitate use of higher filler levels. Exemplary plasticizers include phthalates, dipropylene and diethylene glycol dibenzoates and mixtures thereof, epoxidized soybean oil and the like. Useful sources of dioctyl and diisodecylphthalate include those available under the trade names Jayflex DOP and JayFlex DIDP from Exxon Chemical. The dibenzoates are available as Benzoflex 9-88, Benzoflex 50 and Benzoflex 400 from Velsicol Chemical Corporation. The soybean oil is available from Union Carbide Corporation as Flexol EPO. The plasticizer typically comprises up to 100 parts per hundred parts of the silane terminated polyurethane polymer with 40 to 80 parts per hundred being preferred.

The formulations can include various thixotropic or anti-sagging agents. This class of additives is typified by various castor waxes, fumed silica, treated clays and polyamides. These additives typically comprise 1 to 10 parts per hundred parts of silane terminated polyurethane polymer component with 1 to 6 parts being preferred. The thixotropes include those available as: Aerosil from Degussa, Cabo-Sil TS 720 from Cabot, Castorwax from CasChem, Thixatrol and Thixcin from Rheox and Dislon from King Industries. If the thixotrope is reactive with silane (e.g., silica), adjustments to the amount formulated may be needed to compensate therefor.

U. V. stabilizers and/or antioxidants can be incorporated into the formulations of this invention in an amount from 0 to 5 parts per hundred parts silylated urethane polymer with 0.5 to 2 parts being preferred. These materials are available from Ciba-Geigy under the trade names Tinuvin 770, Tinuvin 327, Tinuvin 213, Tinuvin 622 and Irganox 1010.

Various organofunctional silane adhesion promoters are also useful in those formulations of the present invention, such as sealants, in which the ability to adhere to another surface is desired. These materials are typically employed at levels of 0.5 to 5 parts per hundred parts of the silylated urethane polymer with 0.8 to 1.5 parts per hundred parts polymer being preferred. Suitable adhesion promoters include Silquest A-1120 silane, Silquest A-2120 silane, Silquest A-1170 silane and Silquest A-187 silane, all of which are available from Witco's Organosilicones Group.

In Suitable cure catalysts are the same as those that have been previously described for preparation of the silylated urethane polymers. The catalysts typically compromised 0.01 to 3 parts per hundred parts silylated urethane polymer with 0.01 to 1.0 part per hundred part polymer being preferred.

After mixing, the formulations are cured by exposure to moisture. For example, sealants are typically cured at 23° C. and 50% relative humidity for 3 days and 37° C. and 95% relative humidity for another 4 days.

SILANE TERMINATED URETHANE PREPOLYMER PREPARATIONS

EXAMPLE 1

Endcapper A (Reference): Reaction of 3-Aminopropyltrimethoxysilane and Dimethyl Maleate Into a 1 liter three-necked flask equipped with a magnetic stirrer, addition funnel and thermometer, was added 358.6 g (2.0 moles) of 3-aminopropyltrimethoxysilane. With stirring, 288.6 g (2.0 moles) of dimethyl maleate was added dropwise from the addition funnel, maintaining the temperature of the exothermic reaction between 20–25° C. by external cooling with a cold water bath. The dimethyl maleate was added over a 4.5 hr. period. A gas chromatograph analysis of a sample at this point indicated 78.5% of a product component. Mass spectroscopy and $^{13}C$ nuclear magnetic resonance spectrometry of this sample confirmed this component to be di-N-methyl N-(3-trimethoxysilylpropyl)aspartate. Additional stirring at room temperature over several hours increased the conversion of product to 92.4%. Remaining unreacted components were removed by distillation to a flask temperature of 182° C. and 0.05 mm Hg. yielding 619.1 g of a straw yellow product at 94.3% purity by gas chromatography.

EXAMPLE 2

Endcapper B: Reaction of 4-Amino-3,3-dimethylbutyltrimethoxysilane and Dimethyl Maleate Into a 500 ml three-necked flask equipped with a magnetic stirrer, addition funnel and thermometer, was added 110.7 g (0.5 mole) of 4-amino-3,3-dimethylbutyltrimethoxysilane. The flask was cooled with an ice bath and with stirring, 72.1 g (0.5 mole) of dimethyl maleate, was added dropwise from the addition funnel over a 4 hour period maintaining the temperature of the flask contents between 10–20° C. After stirring overnight, the reaction was 90% complete by gas chromatographic analysis. The unreacted components were removed under vacuum to a temperature of 150° C. to yield 162 g of light yellow liquid at 95% purity by gas chromatography. Mass spectroscopy and $^{13}C$ nmr confirmed this product to be dimethyl N-[4-trimethoxysilyl-(2,2-dimethyl)butyl]aspartate.

EXAMPLE 3

Endcapper D: Reaction of 4-Amino-3,3-dimethylbutyltrimethoxysilane and Dibutyl Maleate In a manner similar to Example 2, 110.7 g (0.5 mole) of 4-amino-3,3-dimethylbutyltrimethoxysilane was allowed to react with 114.3 g (0.5 mole) of dibutyl maleate to give 209 g dibutyl N-[4-trimethoxysilyl-(2,2-dimethyl)butyl] aspartate at 97% purity.

EXAMPLE 4

Endcapper E: Reaction of 3-(3-Aminopropoxy) propyidimethoxymethylsilane and Dimethyl Maleate Following the procedure of Example 2, 110.7 g (0.5 mole) of 3-(3-aminopropoxy)propyldimethoxymethylsilane was allowed to react with 72.1 g (0.5 mole) of dimethyl maleate to yield, after removal of a small amount of unreacted starting materials by vacuum distillation, 158.5 g of light yellow liquid, confirmed by mass spec and $^{13}C$ nmr to be dimethyl 3-N-(3-dimethoxymethylsilylpropoxy) propylaspartate at 97% purity.

EXAMPLE 5

Endcapper J: Reaction of 3-(3-Aminopropoxy) propyidimethoxymethylsilane and Dibutyl Maleate Following the procedure of Example 2, 110.7 g (0.5 mole) of 3-(3-aminopropoxy)propyldimethoxymethylsilane was allowed to react with 114.2 g (0.5 mole) of dibutyl maleate to yield, after removal of a small amount of unreacted starting materials by vacuum distillation, 198.7 g of yellowish-brown liquid, confirmed by mass spec and $^{13}C$ nmr to be dibutyl 3-N-(3-dimethoxymethylsilylpropoxy) propylaspartate at greater than 95% purity.

TABLE I

Endcappers Used in Preparation of Silane Terminated Polyurethane Polymers

| Endcapper | Olefinic Carboxylate Ester | Silane |
|---|---|---|
| A | dimethyl maleate | aminopropyltrimethoxysilane |
| B | dimethyl maleate | 4-amino-3,3-dimethylbutyltrimethoxysilane |
| C | diethyl maleate | 4-amino-3,3-dimethylbutyltrimethoxysilane |
| D | dibutyl maleate | 4-amino-3,3-dimethylbutyltrimethoxysilane |
| E | dimethyl maleate | 3-(3-aminopropoxy)propyldimethoxymethylsilane |

TABLE I-continued

Endcappers Used in Preparation of Silane Terminated
Polyurethane Polymers

| Endcapper | Olefinic Carboxylate Ester | Silane |
|---|---|---|
| F | diethyl maleate | 3-(3-aminopropoxy)propyl-dimethoxymethylsilane |
| G | dibutyl maleate | 3-(3-aminopropoxy)propyl-dimethoxymethylsilane |
| H | dimethyl maleate | 3-(3-aminopropoxy)-propyldimethoxymethylsilane |
| I | diethyl maleate | 3-(3-aminopropoxy)-propyldimethoxymethylsilane |
| J | dibutyl maleate | 3-(3-aminopropoxy)- |

EXAMPLE 6

Preparation of Isocyanate Prepolymer

To a 1000 mL reaction vessel equipped with a mechanical stirrer, a heating mantle, a thermometer, a condenser and a dry nitrogen inlet was charged 60 g of liquid diphenylmethane diisocyanate and 669.9 g of polypropylene glycol (PPG) with an average molecular weight of 4000 (NCO:OH=1.5). The reaction kettle was warmed to 50° C. and dibutyltin dilaurate catalyst (60 ppm Sn) was added. The reaction temperature was increased to 70° C. The reaction was maintained at this temperature for 3 to 4 hours or until the percent (%) free NCO was found to fall in the range of 0.7 to 0.9% by titration. The titration to determine the % free NCO was conducted according to the ASTM D 2572 test specification.

EXAMPLE 7

Preparation of the Silane Terminated Polyurethane Polymers

The NCO-terminated polyurethane prepolymer from above was mixed with 55.80 g of Endcapper A from Example 1 in a one liter reaction vessel. The reaction mixture was heated to 70° C. for five hours and was then cooled to room temperature to produce the silane-terminated polyurethane polymer, I. The NCO content was determined to be 0.0% by titration.

EXAMPLES 8 THROUGH 16

The same procedures described in Example 7 are employed to form endcapped polyurethane prepolymers except that in Examples 8–16, endcappers B through J respectively are used instead of endcapper A.

SEALANT PREPARATIONS

EXAMPLE 17

Preparation of Silane End-Capped Sealants

A sealant composition was prepared which comprised 100 parts of the silane terminated polyurethane prepolymer (I) of Example 7, 100 parts of calcium carbonate, 6 parts of fumed silica, 40 parts plasticizer, and a minor amount of light stabilizers. These ingredients were charged to a one quart Ross double planetary In mixer. The mixture was heated to 80° C., under vacuum, for two hours. The mixture was then cooled to 35° C. and 1.5 parts of adhesion promoter and 0.063 parts of dibutyltin dilaurate were added and mixed for an additional hour. The mixer was then evacuated to a pressure of <5 mm Hg for five minutes to afford Sealant L.

Comparative sealants are prepared using the same procedure except that in Sealants M through U, the silane terminated polyurethane polymers formed in Examples 8–16, respectively, replace the polymer of Example 7 used in making Sealant L.

The combinations of endcapper, silane terminated polyurethane resin, and sealant are listed in Table II.

TABLE II

| Endcapper | Silane Terminated Resin | Sealant |
|---|---|---|
| A | I | L |
| B | II | M |
| C | III | N |
| D | IV | O |
| E | V | P |
| F | VI | Q |
| G | VII | R |
| H | VIII | S |
| I | IX | T |
| J | X | U |

The physical properties of cured sealants were determined by tensile, tear and elongation tests using American Society for Testing and Materials (A.S.T.M.) Methods D 412 and D 624.

Adducts of 4-amino-3,3-dimethylbutyltrimethoxysilane with dimethyl maleate and with dibutyl maleate, and for comparison purposes adducts of 3-aminopropyltrimethoxysilane with dimethyl maleate and with dibutyl maleate, were prepared into sealant formulations as described herein. The resulting sealants were cured, and the cured formulations were tested for tear resistance, tensile strength, % elongation, durability, hardness (Shore A), and Young's Modulus. The results are set forth in the following Table III.

TABLE III

| | 4-Amino-3,3-dimethyl-butyltrimethoxysilane | | 3-aminopropyl trimethoxysilane | |
|---|---|---|---|---|
| | w/dimethyl maleate | w/dibutyl maleate | w/dimethyl maleate | w/dibutyl maleate |
| Tear Resistance (lb/in) | 52 | 44 | 36 | 29 |
| Tensile Strength (psi) | 190 | 207 | 203 | 166 |
| % Elongation | 261 | 291 | 161 | 168 |
| Durability (tensile × elongation) | 49590 | 60158 | 32759 | 27838 |
| Shore A Hardness | 36 | 31 | 42 | 36 |
| Young's Modulus | 88 | 92 | 132 | 117 |

What is claimed is:

1. A composition of matter which is the product of reacting (A) a prepolymer obtained by reacting a polyol component with an excess of an isocyanate component selected from the group consisting of polyisocyanate compounds and mixtures thereof so that said prepolymer contains unreacted isocyanate groups with (B) a silane of the formula (1)

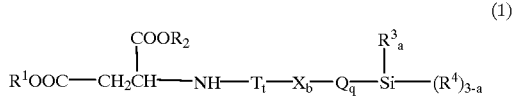

in which
R¹ and R² represent identical or different alkyl groups having 2 to 4 carbon atoms;
R³ represents an alkyl radical having 1 to 6 carbons;
R⁴ represents a $C_1$ to $C_6$ alkoxy group or a ketoximato group of the formula $(R^x)(R^y)C=N-O-$ wherein each of $R^x$ and $R^y$ is methyl or ethyl;
T represents an alkylene radical of 1 to 6 carbons and may be linear, branched or cyclic;
Q represents an alkylene radical of 1 to 10 carbons and may be linear, branched or cyclic;
X is chosen from the group consisting of —O— and —S—;
a is 0, 1 or 2;
b is 0 or 1;
t is 0 or 1; and
q is 0 or 1;
provided that when b is zero, then t and q cannot both be zero; and
provided that when b is 1, then t is 1 and q is 1;
and provided that when b=0, then at least one of T and Q is a branched alkyl.

2. A composition of matter according to claim 1 wherein R¹ and R² are both ethyl.

3. A composition of matter according to claim 1 wherein R¹ and R² are both propyl.

4. A composition of matter according to claim 1 wherein R¹ and R² are both butyl.

5. A composition of matter according to claim 1 wherein a is 1.

6. A composition of matter according to claim 1 wherein R³ is methyl.

7. A composition of matter according to claim 1 wherein R⁴ is methoxy.

8. A composition according to claim 1 wherein b=0 and at least one of T and Q is a branched alkyl.

9. A composition of matter according to claim 1 wherein b is 1 and X is —O—.

10. A composition of matter according to claim 1 wherein $-T_t-X_b-Q_q-$ is $-(CH_2)_3-O-(CH_2)_3-$.

11. A composition of matter according to claim 8 wherein $-T_t-X_b-Q_q-$ is $-CH_2-C(CH_3)_2-CH_2CH_2-$.

12. A composition of matter according to claim 8 wherein $-T_t-X_b-Q_q-$ is $-CH_2-CH(CH_3)-CH_2CH_2-$.

13. A composition of matter according to claim 1 wherein said isocyanate component comprises one or more compounds selected from the group consisting of 2,4-toluene diisocyanate, 2,6-toluene diisocyanate, 2,4-diphenyl-methanediisocyanate, 4,4'-diphenyl-methanediisocyanate, isophorone diisocyanate, dicyclohexylmethane-4,4'-diisocyanate, and mixtures thereof.

14. A composition of matter according to claim 11 wherein said isocyanate component comprises one or more compounds selected from the group consisting of 2,4-diphenylmethane diisocyanate, 4,4'-diphenylmethane diisocyanate, and mixtures thereof.

15. A composition of matter according to claim 1 wherein said polyol component is selected from the group consisting of polyols having a molecular weight of between 250 and 16,000.

16. A composition of matter according to claim 1 wherein said polyol component comprises polypropylene glycol having an equivalent weight between 500 and 6,000.

17. A curable formulation which upon curing exhibits elongation, tensile strength, and tear resistance, comprising a composition of matter according to claim 1, a cure catalyst, and one or more adjuvants selected from the group consisting of fillers, plasticizers, thixotropes, antioxidants, ultraviolet stabilizers, and adhesion promoters.

18. A formulation according to claim 17 wherein R¹ and R² are both ethyl.

19. A formulation according to claim 17 wherein R¹ and R² are both propyl.

20. A formulation according to claim 17 wherein R¹ and R² are both butyl.

21. A formulation according to claim 17 wherein a is 1.

22. A formulation according to claim 17 wherein R³ is methyl.

23. A formulation according to claim 17 wherein R⁴ is methoxy.

24. A formulation according to claim 17 wherein b=0 and at least one of T and Q is a branched alkyl.

25. A formulation according to claim 17 wherein b is 1 and X is —O—.

26. A formulation according to claim 17 wherein $-T_t-X_b-Q_q-$ is $-(CH_2)_3-O-(CH_2)_3-$.

27. A formulation according to claim 24 wherein $-T_t-X_b-Q_q-$ is $-CH_2-C(CH_3)_2-CH_2CH_2-$.

28. A formulation according to claim 24 wherein $-T_t-X_b-Q_q-$ is $-CH_2-CH(CH_3)-CH_2CH_2-$.

29. A formulation according to claim 17 wherein said isocyanate component comprises one or more compounds selected from the group consisting of 2,4-toluene diisocyanate, 2,6-toluene diisocyanate, 2,4-diphenyl-methanediisocyanate, 4,4'-diphenyl-methanediisocyanate, isophorone diisocyanate, dicyclohexylmethane-4,4'-diisocyanate, and mixtures thereof.

30. A formulation according to claim 29 wherein said isocyanate component comprises one or more compounds selected from the group consisting of 2,4-diphenylmethane diisocyanate, 4,4'-diphenylmethane diisocyanate, and mixtures thereof.

31. A formulation according to claim 17 wherein said polyol component is selected from the group consisting of polyols having a molecular weight of between 250 and 16,000.

32. A formulation according to claim 31 wherein said polyol component comprises polypropylene glycol having an equivalent weight between 500 and 6,000.

33. A process of making a composition of matter which upon curing exhibits elongation, tensile strength, and tear resistance, comprising reacting (A) a prepolymer obtained by reacting a polyol component with an excess of an isocyanate component selected from the group consisting of poly-isocyanate compounds and mixtures thereof so that said prepolymer contains unreacted isocyanate groups with (B) a silane of the formula (1)

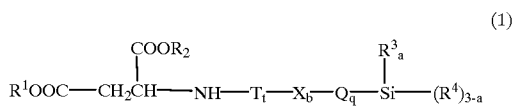

in which
R¹ and R² represent identical or different alkyl groups having 2 to 4 carbon atoms;
R³ represents an alkyl radical having 1 to 6 carbons;

$R^4$ represents a $C_1$ to $C_6$ alkoxy group or a ketoximato group of the formula $(R^x)(R^y)C=N-O-$ wherein each of $R^x$ and $R^y$ is methyl or ethyl;

T represents an alkylene radical of 1 to 6 carbons and may be linear, branched or cyclic;

Q represents an alkylene radical of 1 to 10 carbons and may be linear, branched or cyclic;

X is chosen from the group consisting of —O— and —S—;

a is 0, 1 or 2;

b is 0 or 1;

t is 0 or 1; and q is 0 or 1;

provided that when b is zero, then t and q cannot both be zero; and provided that when b is 1, then t is 1 and q is 1;

and provided that when b=0, then at least one of T and Q is a branched alkyl.

34. A process according to claim 33 wherein $R^1$ and $R^2$ are both ethyl.

35. A process according to claim 33 wherein $R^1$ and $R^2$ are both propyl.

36. A process according to claim 33 wherein $R^1$ and $R^2$ are both butyl.

37. A process according to claim 33 wherein a is 1.

38. A process according to claim 33 wherein $R^3$ is methyl.

39. A process according to claim 33 wherein $R^4$ is methoxy.

40. A process according to claim 33 wherein b=0 and at least one of T and Q is a branched alkyl.

41. A process according to claim 33 wherein b is 1 and X is —O—.

42. A process according to claim 33 wherein $-T_t-X_b-Q_q-$ is $-(CH_2)_3-O-(CH_2)_3-$.

43. A process according to claim 40 wherein $-T_t-X_b-Q_q-$ is $-CH_2-C(CH_3)_2-CH_2CH_2-$.

44. A process according to claim 40 wherein $-T_t-X_b-Q_q-$ is $-CH_2-CH(CH_3)-CH_2CH_2-$.

45. A process according to claim 33 wherein said isocyanate component comprises one or more compounds selected from the group consisting of 2,4-toluene diisocyanate, 2,6-toluene diisocyanate, 2,4-diphenyl-methanediisocyanate, 4,4'-diphenyl-methanediisocyanate, isophorone diisocyanate, dicyclohexylmethane-4,4'-diisocyanate, and mixtures thereof.

46. A process according to claim 45 wherein said isocyanate component comprises one or more compounds selected from the group consisting of 2,4-diphenylmethane diisocyanate, 4,4'-diphenylmethane diisocyanate, and mixtures thereof.

47. A process according to claim 33 wherein said polyol component is selected from the group consisting of polyols having a molecular weight of between 250 and 16,000.

48. A process according to claim 33 wherein said polyol component comprises polypropylene glycol having an equivalent weight between 500 and 6,000.

* * * * *